United States Patent
Schultz et al.

(10) Patent No.: US 11,225,128 B2
(45) Date of Patent: Jan. 18, 2022

(54) ADJUSTABLE VEHICLE DOOR

(71) Applicants: Jason E Schultz, Clarkston, MI (US); Robert J Reagle, Sterling Heights, MI (US)

(72) Inventors: Jason E Schultz, Clarkston, MI (US); Robert J Reagle, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 168 days.

(21) Appl. No.: 16/591,168

(22) Filed: Oct. 2, 2019

(65) Prior Publication Data
US 2021/0101456 A1    Apr. 8, 2021

(51) Int. Cl.
*B60J 5/04*    (2006.01)
*B60J 10/80*   (2016.01)

(52) U.S. Cl.
CPC .......... *B60J 5/0463* (2013.01); *B60J 5/0402* (2013.01); *B60J 5/0472* (2013.01); *B60J 10/80* (2016.02)

(58) Field of Classification Search
CPC ...... B60J 5/0463; B60J 5/0468; B60J 5/0408; B60J 5/0411; B60J 10/80; B60J 5/0402; B60J 5/0472
See application file for complete search history.

(56) References Cited

U.S. PATENT DOCUMENTS 10,583,716 B2 *  3/2020  Bito ....................... B60J 5/0463
10,844,643 B2 * 11/2020  Freymuth ................. B60J 1/17

2004/0021343 A1 *  2/2004  Dobbs ................... B60J 5/0408
                                                        296/201
2004/0221512 A1 * 11/2004  Hoffman ................ B60J 5/0408
                                                        49/440
2007/0261313 A1 * 11/2007  Ruppert ................. B60J 5/0406
                                                        49/502

(Continued)

FOREIGN PATENT DOCUMENTS

DE          10237436 A1 *  3/2004   ........... B60J 5/0463
DE       102017001512 A1   8/2017

(Continued)

OTHER PUBLICATIONS

International Search Report and Written Opinion dated Jan. 13, 2021 for International Application No. PCT/US2020/053827, International Filing Date Oct. 1, 2020.

*Primary Examiner* — Marcus Menezes
(74) *Attorney, Agent, or Firm* — Ralph E. Smith

(57) ABSTRACT

In at least some implementations, a vehicle door includes a first section having a first void, a second section having a first projection, a first intermediate member received within the first void and having an inner surface that defines an interior, wherein the first projection is received within the interior, and a first coupler coupled to the first projection. The interior of the first intermediate member has at least a portion that is larger than the portion of the first projection received within that portion of the interior to permit movement of the first projection relative to the intermediate member. The first coupler is coupled to the intermediate member to maintain the position of the first projection relative to the first section. In this way, the position of the second section may be adjusted relative to the first section and the adjusted position can be maintained.

11 Claims, 4 Drawing Sheets

(56) References Cited

U.S. PATENT DOCUMENTS

2018/0086184 A1* 3/2018 Stickles ................. B60J 5/0486
2019/0061487 A1* 2/2019 Kleinhoffer ............ B60J 5/0476

FOREIGN PATENT DOCUMENTS

| | | | | |
|---|---|---|---|---|
| FR | 2939343 | A1 | 6/2010 | |
| GB | 2316431 | A | 2/1998 | |
| JP | 59070223 | A * | 4/1984 | ............ B60J 5/0476 |
| JP | 59075827 | A * | 4/1984 | ............ B60J 5/0408 |
| JP | 59089219 | A * | 5/1984 | ............ B60J 5/0408 |
| JP | 60197427 | A * | 10/1985 | ................ B60J 1/14 |

* cited by examiner

ADJUSTABLE VEHICLE DOOR

FIELD

The present disclosure relates to a vehicle door with a section that is adjustable relative to another section.

BACKGROUND

Some vehicles include doors formed from more than one section, with a section being releasably or removably coupled to another section so that the vehicle can be operated with a partial door. Due to variances in dimensions of manufactured parts, the fit of a door both with respect to the vehicle and the fit of different sections of a multiple section door is different within a production run of doors and vehicles. Accordingly, it can be difficult to properly align the door with the vehicle and to properly align the various door sections relative to each other. In addition to providing a worse than desired fit and finish for the vehicle, this can make it difficult to obtain a desired compression of the weather seal between the door and vehicle body which is needed to, among other things, provide a good wind and water seal between the door and vehicle.

SUMMARY

In at least some implementations, a vehicle door includes a first section having a first void, a second section having a first projection, a first intermediate member received within the first void and having an inner surface that defines an interior, wherein the first projection is received within the interior, and a first coupler coupled to the first projection. The interior of the first intermediate member has at least a portion that is larger than the portion of the first projection received within that portion of the interior to permit movement of the first projection relative to the intermediate member. The first coupler is coupled to the intermediate member to maintain the position of the first projection relative to the first section. In this way, the position of the second section may be adjusted relative to the first section and the adjusted position can be maintained.

In at least some implementations, the first projection includes a threaded void and the first coupler has a threaded section received within the threaded void for rotation relative to the projection about an axis. The first coupler may include a head that engages the first intermediate member when the first coupler is rotated so that it is advanced farther into the threaded void to inhibit or prevent movement of the first projection relative to the first intermediate member. The first coupler may be coupled to the first intermediate member so that rotation of the first coupler about the axis does not move the first coupler along the axis, and rotation of the first coupler in a first direction causes movement of the first projection relative to the first intermediate member in a first direction and rotation of the first coupler in a second direction causes movement of the first projection relative to the first intermediate member in a second direction.

In at least some implementations, the first projection and first intermediate member include cooperating retention features that are engageable to define at least two positions of the first projection relative to the first intermediate member, and the first coupler is a threaded fastener that when loosened permits movement of the first projection relative to the first intermediate member among said at least two positions and when tightened prevents movement of the first projection relative to the first intermediate member to maintain a position of the second section relative to the first section. The first projection may be coupled to a body of the second section at a first end and extends to a second end, and the first intermediate member may include an open first end and an at least partially closed second end, and the cooperating retention features may include at least one of projections and voids, or teeth formed on or in the second end of the first intermediate member and on or in the second end of the first projection. In at least some implementations, the first intermediate member is closely received in the first void in the cross-car direction to limit or prevent movement of the first intermediate member relative to the first section in the cross-car direction.

In at least some implementations, the second section includes a second projection coupled to the second section and the first section also comprises a second receptacle in which the second projection is received. The door may also include a second intermediate member and a second coupler coupled to the second projection and the second intermediate member, and the second intermediate member has an interior with at least a portion that is larger than the corresponding portion of the second projection to permit movement of the second projection relative to the second intermediate member. And the second coupler may be coupled to the second intermediate member to maintain the position of the second projection relative to the second intermediate member. The first projection may be movable relative to the first intermediate member independently of any movement of the second projection relative to the second intermediate member. This permits, for example, a forward portion of the door to be adjusted more than or independently of a rearward portion of the door.

In at least some implementations, the first projection has a free end and the first projection engages the first intermediate member at a location spaced from the free end and wherein the free end is movable relative to the first intermediate member to change the cross-car angle of the second section relative to the first section. Movement of the first projection relative to the first intermediate member may change the orientation of the second section relative to the first section.

In at least some implementations, a vehicle door includes a first section having a first receptacle, a second section having a first projection, and a first coupler coupled to the first projection. The first receptacle has at least a portion that is larger than the portion of the first projection received within said portion of the first receptacle to permit movement of the first projection relative to the first section, and the first coupler is coupled to the first projection to maintain the position of the first projection relative to the first section.

In at least some implementations, the first section includes a void and a first intermediate member is received within the void and has an interior in which at least part of the projection is received, and the first receptacle is defined by the void and the first intermediate member. In at least some implementations, the first intermediate member is closely received in the void in the cross-car direction to limit or prevent movement of the first intermediate member relative to the first section in the cross-car direction, and the interior of the first intermediate member is larger than at least part of the projection in the cross-car direction to permit movement of the projection relative to the first intermediate member in the cross-car direction. In at least some implementations, the first coupler maintains the position of the first projection relative to the first intermediate member.

In at least some implementations, the second section includes a second projection coupled to the second section and the first section also includes a second receptacle in which the second projection is received, a second intermediate member is provided and a second coupler is coupled to the second projection and the second intermediate member. The second intermediate member has an interior with at least a portion that is larger than the corresponding portion of the second projection to permit movement of the second projection relative to the second intermediate member, and the second coupler being coupled to the second intermediate member to maintain the position of the second projection relative to the second intermediate member. In at least some implementations, the first projection is movable relative to the first intermediate member independently of any movement of the second projection relative to the second intermediate member.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
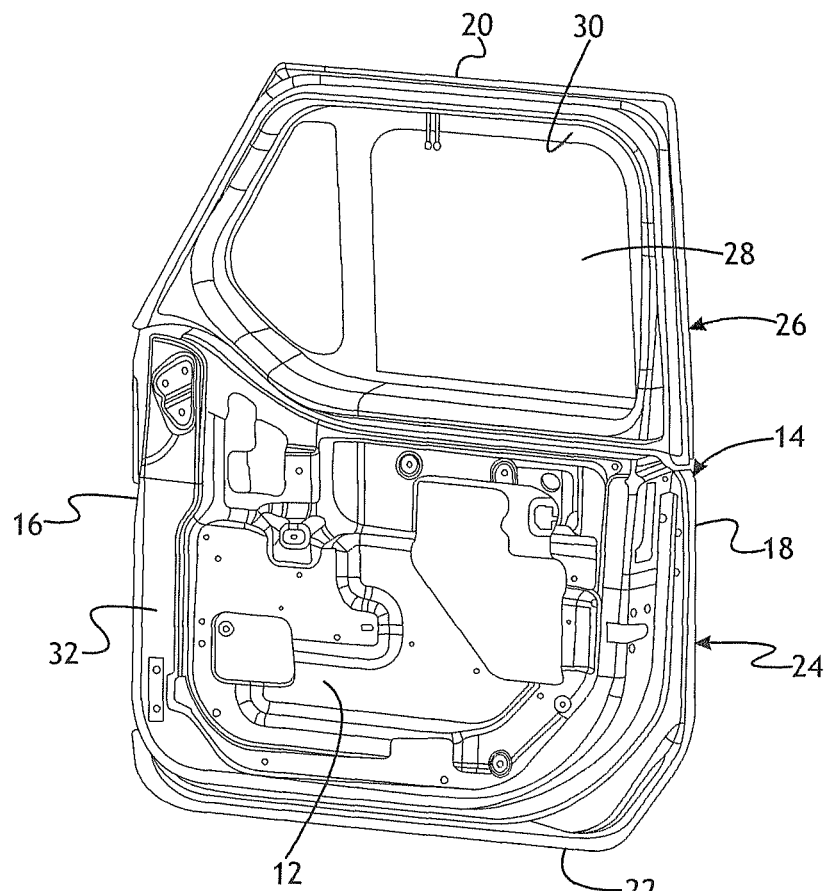
FIG. 1 a perspective view of a vehicle door having a first section that is coupled to a vehicle and a second section coupled to the first section.

Referring in more detail to the drawings, FIG. 1 illustrates a vehicle door 10 having multiple sections that may be releasably coupled together. The door 10 includes an inner side 12 that faces a passenger compartment of the vehicle and an opposite, outer side 14 that defines part of an exterior of the vehicle, as is known in the art. The door 10 has a cross-car thickness between the inner and outer sides 12, 14, where cross-car generally denotes a direction extending between left/right or driver/passenger sides of the vehicle and which is perpendicular to the forward travel of the vehicle. The door 10 has forward and rearward sides 16, 18 that are spaced apart in a fore-aft direction that is generally perpendicular to the cross-car direction and which extends generally from the front of the vehicle to the rear. And the door 10 has upper and lower sides 20, 22 that are adjacent to a roof and floor of the vehicle, respectively, and are spaced apart in a vertical direction that is perpendicular to both the cross-car and fore-aft directions.

A first section 24 of the door 10 may be arranged to be coupled to a vehicle body, such as by one or more hinges, to permit the door 10 to pivot/swing relative to the vehicle body between open and closed positions. The first section 24 may be removably or releasably coupled to the vehicle body, if desired, to permit the vehicle to be used without the vehicle door 10 coupled thereto. A second section 26 of the door 10 may be coupled to the first section 24 for movement relative to the vehicle body with the first section 24. In the implementation shown, the second section 26 includes a window 28 and associated frame 30 and the first section 24 includes a base or main body 32 of the door 10 that is oriented below the second section 26. The second section 26 may be removably or releasably coupled to the first section 24 to permit the vehicle to be operated with only the first section 24 of the door 10 attached thereto, as desired.

Figure 2:
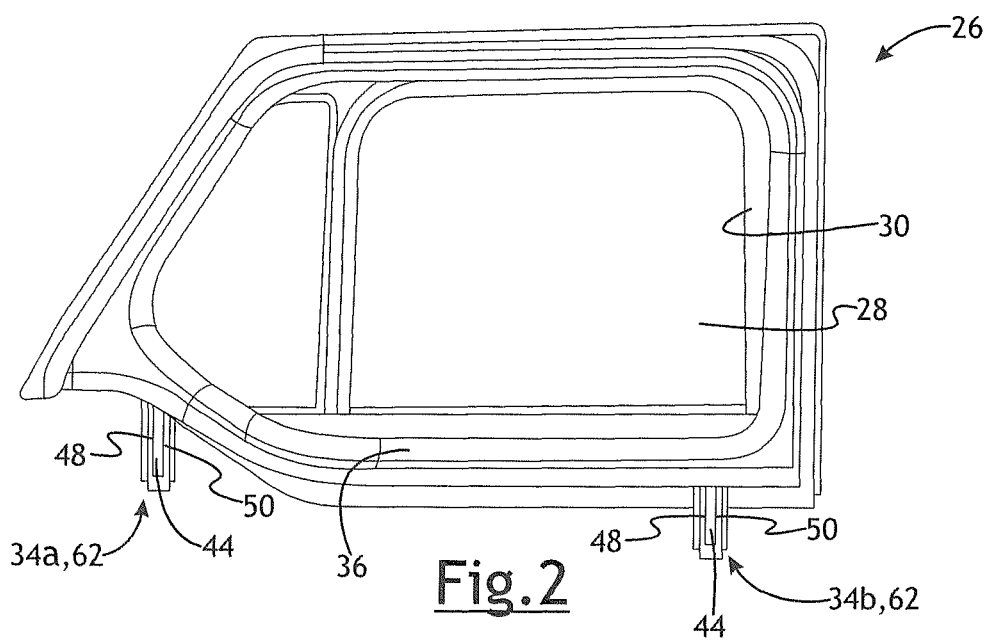
FIG. 2 is a fragmentary sectional view showing a projection of the second section received within a receptacle of the first section.

To couple the second section 26 to the first section 24, the second section 26 includes one or more projections 34 that are received within respective voids in the first section 24 of the door 10. In the implementation shown in FIG. 2, the second section 26 includes two projections 34 that are sometimes referred to herein as a first projection 34a and a second projection 34b, and which are spaced apart in the fore-aft direction. The projections 34a, 34b may both extend from a body of the second section 26 which defines or includes the window frame 30, and more particularly, from a lower portion or base 36 of the window frame 30. Of course, a window frame 30 is not necessary and the projections 34 may extend from a lower portion of the second section 26 if no window 28 or window frame 30 is provided. The projections 34 are preferably arranged between the inner and outer sides 12, 14 of the door 10 and between the forward and rearward sides 16, 18. And because the projections 34 are arranged at a junction between the first and second sections 26 of the door 10, the projections 34 are also between the upper and lower sides 20, 22 of the door 10.

The first and second projections 34a, 34b may be constructed in the same manner and only one will be discussed in detail and referred to by reference numeral 34, to facilitate description of the door 10. The projection 34 may extend from a first end 38 coupled to or formed in the same piece of material as a portion of the second section 26 to a second end 40 spaced from the window frame 30 and defining a free end of the projection 34. The projection 34 may be integrally formed as part of an inner support structure of the second section 26 that may be covered at least partially by a trim piece 42 defining an inner surface of the second section 26. Thus, the projection 34 may be part of the structural member of the second section 26 and/or may be rigidly coupled thereto such that the projection 34 does not move independently of the structural member(s) of the second section 26. In other words, in at least some implementations, when the projection 34 moves, the remainder of the second section 26 also moves (allowing for some bending or flexing of the projection 34 relative to the second section 26 in some circumstances).

The projection 34 may have any desired cross-sectional shape, including, for example, a quadrilateral with inner and outer surfaces 44, 46 that may be generally flat or planar and spaced apart in the cross-car direction, and forward and rearward surfaces 48, 50 spaced apart in the fore-aft direction. The cross-sectional area of the projection 34 taken in a plane extending in the fore-aft and cross-car directions may be the same along its length, or it may vary, as desired. In at least some implementations, the projections 34 are tapered and have their smallest cross-sectional area at their free ends 40, and a greater cross-sectional area at a location spaced from the free end 40. In assembly, the projections 34 are received within a corresponding receptacle which may be defined at least in part by respective voids 52 in the first section 24 of the door 10.

Each void 52 may extend into the first section 24 from an upper surface 54 of the first section 24 and may be arranged between the inner and outer sides 12, 14 of the door 10 and between the forward and rearward sides 16, 18 of the first section 24. Thus, the voids 52 are covered by the second section 26 when the second section 26 is coupled to the first section 24 of the door 10, as will be described in more detail below. The voids 52 may be defined by openings in the structural member(s) of the first section 24, such as in sheet metal that defines at least part of the first section 24. The voids 52 may be defined by sidewalls 56 that may surround/define four sides of the void 52 which may be joined to or formed with a bottom wall 58 of the void 52, which may be open at its top, at the upper surface 54 and opposite the bottom wall 58 for receipt of a projection 34 through the top of the void 52. Openings 60 may be provided through one or more walls 56 and communicating with the void 52. The projections 34 or an intermediate member 62 between the projections 34 and the walls 56, may include outwardly extending tabs 64 that may be received within the openings 60 in assembly, to releasably retain the second section 26 relative to the first section 24.

Figure 3:
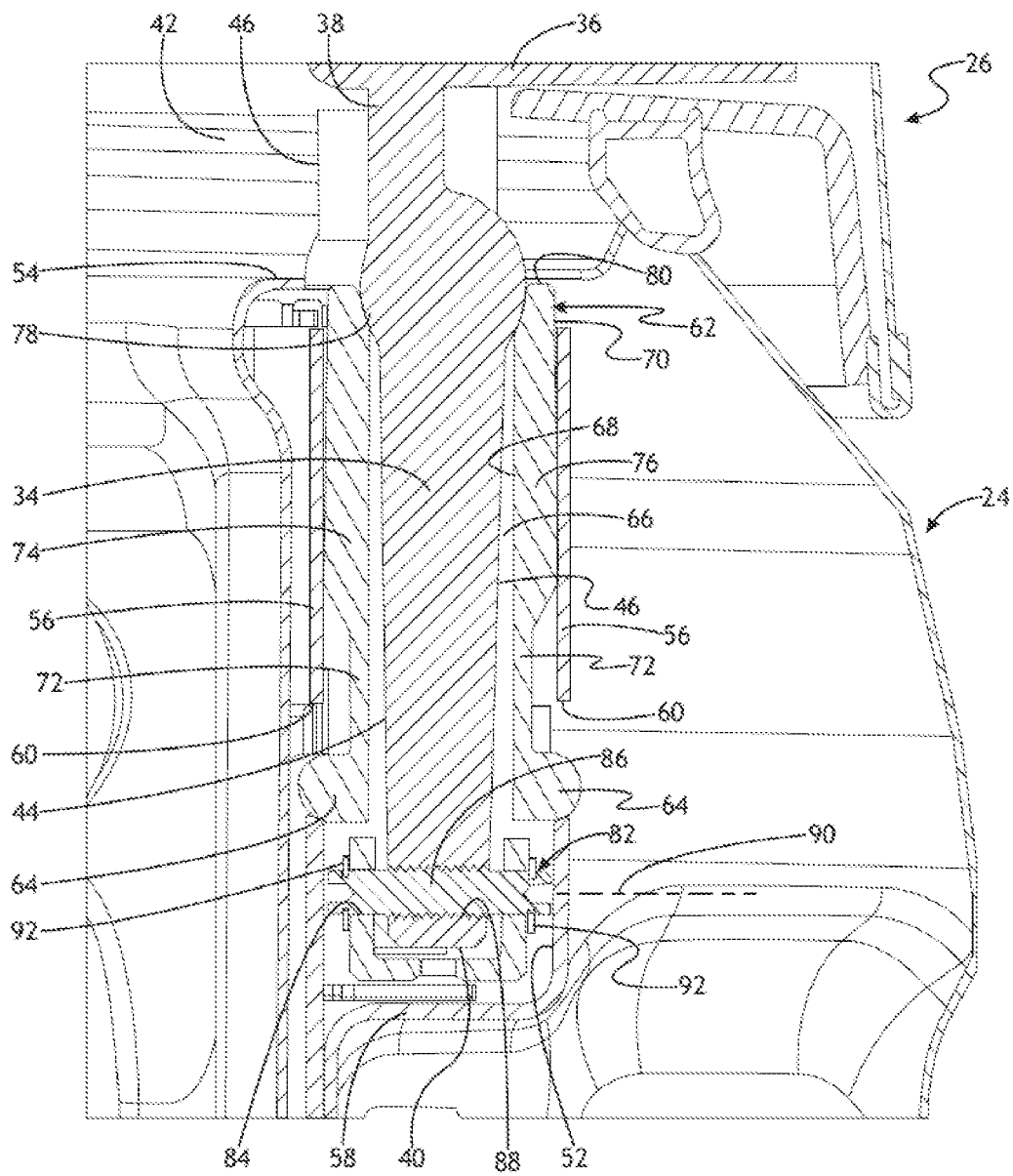
FIG. 3 is an enlarged view similar to FIG. 2.
Figure 4:
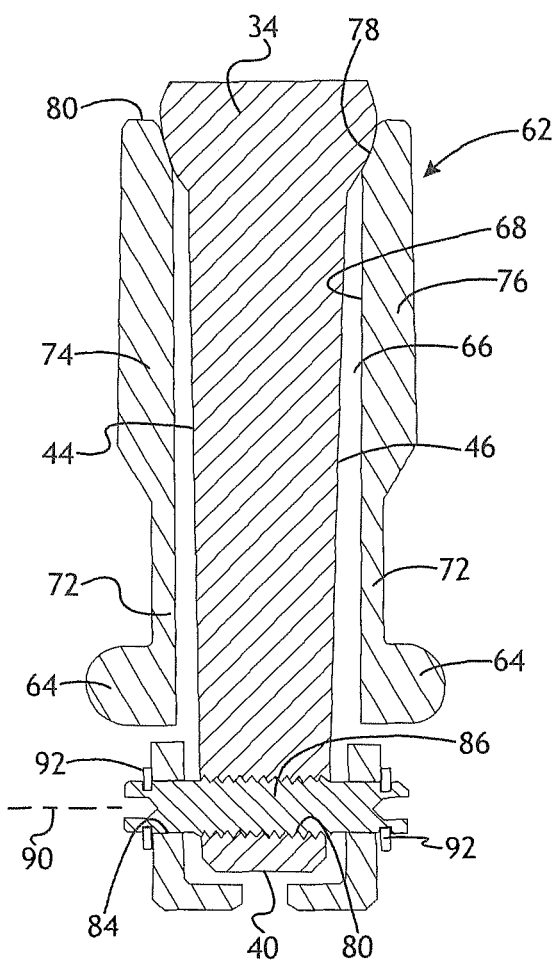
FIG. 4 is a sectional side view of the projection and an intermediate member coupled to the projection.

In at least some implementations, as shown in FIGS. 3 and 4, an intermediate member 62 may be provided for each projection 34. Each intermediate member 62 may be received around a respective one of the projections 34a, 34b and may be received in a corresponding one of the voids 52 in the first section 24. The intermediate members 62 may be a grommet or sleeve and may be formed of plastic, a composite or other material, as desired, and may reduce vibrations between the first section 24 and second section 26, improve the fit between the sections, and/or facilitate adjustment of the second section 26 as described in more detail below. Each intermediate member 62 may include an open interior 66 that defines at least part of the receptacle in which a projection 34 is received. The interior 66 may be defined by an inner surface 68 of the intermediate member 62 and an opposite outer surface 70 may be arranged for an interference, friction or line fit within a corresponding void 52 of the first section 24 so that movement of the intermediate member 62 relative to the first section 24 is inhibited of prevented. The intermediate member 62 may include one or more than one releasable retention features adapted to engage the first section 24 to releasably retain the intermediate member 62 within the void 52. In at least some implementations, the intermediate member 62 includes outwardly extending tabs 64 carried by fingers 72 that flex inwardly when the intermediate member 62 is initially received within a void 52 and then which resiliently return to their unflexed position when the tabs 64 are aligned with the openings 60 such that the tabs 64 extend outwardly into the openings 60 and resist withdrawal of the intermediate member 62 from the void 52. The tabs 64 may be moved inwardly to clear the walls 56 defining the openings 60 when removal of the intermediate member 62 from the first section 24 is desired, for example, when removing the second section 26 from the first section 24.

The inner surface 68 may be defined by walls of the intermediate member 62 that provide the interior with a size and shape for receipt of a corresponding projection 34 therein. In at least some implementations, the interior 66 of the intermediate member 62 is larger in at least one dimension than is the corresponding projection 34 to permit some movement of the projection 34 relative to the intermediate member 62. In the implementation shown in FIGS. 1-4, surfaces or walls 74, 76 of the intermediate member 62 that are spaced apart in the fore-aft direction and which extend in the cross-car direction are larger in the cross-car direction than are the corresponding sides of the projection 34. This permits movement of the projection 34 in the cross-car direction, which movement adjusts the cross car position of the second section 26 relative to the first section 24 (e.g. tilts the second section 26 in the cross-car direction, either inwardly or outwardly, relative to the first section 24). The interior 66 of the intermediate member 62 may also be larger than the projection 34 in the fore-aft direction and/or the vertical direction, as desired, for example, to accommodate projections 34 of different sizes due to tolerances or by design. In at least some implementations, the projections 34 may include an engagement area 78 defined by a portion that engages the intermediate member 62 at or near the open upper end 80 of the intermediate member 62. This limits insertion of the projection 34 into the intermediate member 62 and firmly engages the projection 34 with the intermediate member 62 such that the projection 34 is supported by the intermediate member 62. Each projection 34 may also be coupled to the intermediate member 62 via a coupler 82 that engages both the projection 34 and the intermediate member 62.

Each coupler 82 may be of any construction and is shown as extending through an opening 84 in the intermediate member 62 and having a threaded section 86 that is received within a threaded void 88 in a corresponding projection 34. The coupler 82 may be rotated about an axis 90 to cause relative movement between the coupler 82 and the projection 34. That is, one or both of the coupler 82 and projection 34 may move axially (relative to the axis of rotation) when the coupler 82 is rotated. In implementations where cross-car movement of the projection 34 relative to the intermediate member 62 and first section 24 are desired, the axis of the coupler 82 may be oriented in the cross-car direction. In at least some implementations, the coupler 82 is constrained against axial movement and rotation of the coupler 82 moves the projection 34 relative to the intermediate member 62, which inclines the second section 26 relative to the first section 24. When the coupler 82 is rotated in a first direction, the projection 34 moves inwardly, toward the passenger compartment, and when the coupler 82 is rotated in a second direction, the projection 34 moves outwardly, toward the exterior of the vehicle. The second section 26 is tilted about the engagement surface 78 and relative to the first section 24 when the coupler 82 is rotated and the projection 34 is displaced within the receptacle/intermediate member 62.

In the example shown, the coupler 82 is constrained against axial movement by two clips 92 that engage unthreaded portions of the coupler 82 that extend outwardly from opposite sides of the intermediate member 62. So arranged, the clips 92 engage opposite portions of the outer surface of the intermediate member 62 so that the coupler 82 is constrained against movement in either direction along the axis 90. The coupler 82 may rotate relative to the clips 92, or the clips 92 may rotate with the coupler 82 when it is rotated, as desired. Instead of clips 92 the coupler 82 may include an enlarged head at one end that is formed in the same piece of material as the threaded section and a clip or fastener on the other end.

In use, each projection 34 may be inserted into the interior 66 of an intermediate member 62 (e.g. a receptacle) and the coupler(s) 82 associated with one or more of the projections 34 may be rotated to adjust the cross-car inclination of such projection(s) 34 relative to the intermediate member 62. In the implementation shown, the first projection 34*a* is received in a first intermediate member 62 and the second projection 34*b* is received in a second intermediate member 62, which may be constructed in the same way as the first intermediate member 62. The second section 26 may then be coupled to the first section 24 by inserting the coupled projections 34 and intermediate members 62 into respective first and second voids 52 in the first section 24. To adjust the second section 26 relative to the first section 24, the coupler 82 associated with one or both projections 34*a*, 34*b* may be rotated while the second section 26 is still installed on the first section 24 (when access to the couplers 82 is provided in such installed position, such as by removal of an interior trim piece from the first section 24), or the second section 26 may be removed from the first section 24 and one or both couplers 82 rotated as desired. Further, the projections 34 may be received directly in first and second voids 52 of the first section 24 without any intermediate member 62 provided. In that case, the projections 34 would be installed in a respective void 52 in the first section 24, and then the couplers 82 would be installed with a portion engaging a surface of the first section 24 and a portion threadedly engaging the corresponding projection 34 to permit adjustment of and maintaining a desired position of the projections 34 relative to the first section 24. Thus, a receptacle for a projection 34 may be defined by the first section 24 alone (e.g. a void 52 in the first section 24), or the first section 24 and an intermediate member 62 received within a void 52 of the first section 24.

The second section 26 of the door 10 may be adjusted relative to the first section 24 by rotation of the coupler 82 to move the projection 34 within the intermediate member 62 (or within the void 52/receptacle if no intermediate member 62 is used and the projection 34 is received directly within a void 52). In the implementation shown, the second section 26 may be tilted in the cross-car direction relative to the first section 24. Further, with more than one projection 34 provided, each of which may be adjusted independently of the others, adjustments of the second section 26 may be made that do not move the entire second section 26 but rather permit forward and rearward portions of the second section 26 to be moved in the cross-car direction. This enables improved control of the position or orientation of the second section 26. Among other things, the adjustments change the position of the second section 26 relative to the vehicle to which the first section 24 is attached, and may permit adjustment and improvement of an engagement of the second section 26 with a weather seal surrounding the opening in which the door 10 is mounted. Thus, wind noise may be reduced and water intrusion or leaking reduced or prevented by adjusting the position or orientation of the second section 26 of the door 10 as described above. This adjustment facilitates proper alignment of doors across a production run of components which produce parts of different size and orientation due to tolerances inherent in the manufacturing of these components.

Figure 5:
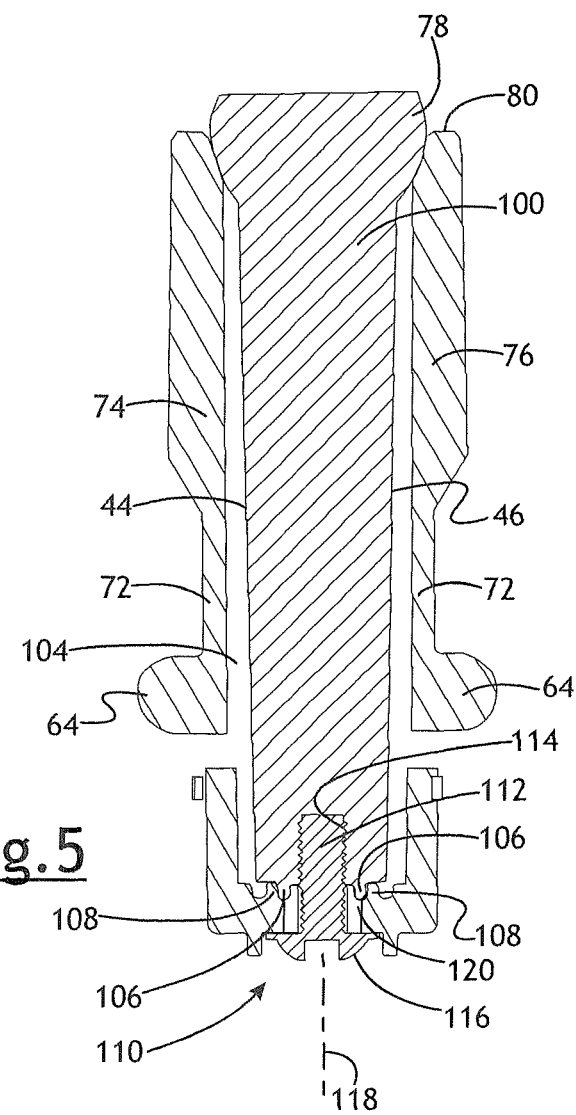
FIG. 5 is a sectional side view of a modified projection and corresponding intermediate member coupled to the projection.
Figure 6:
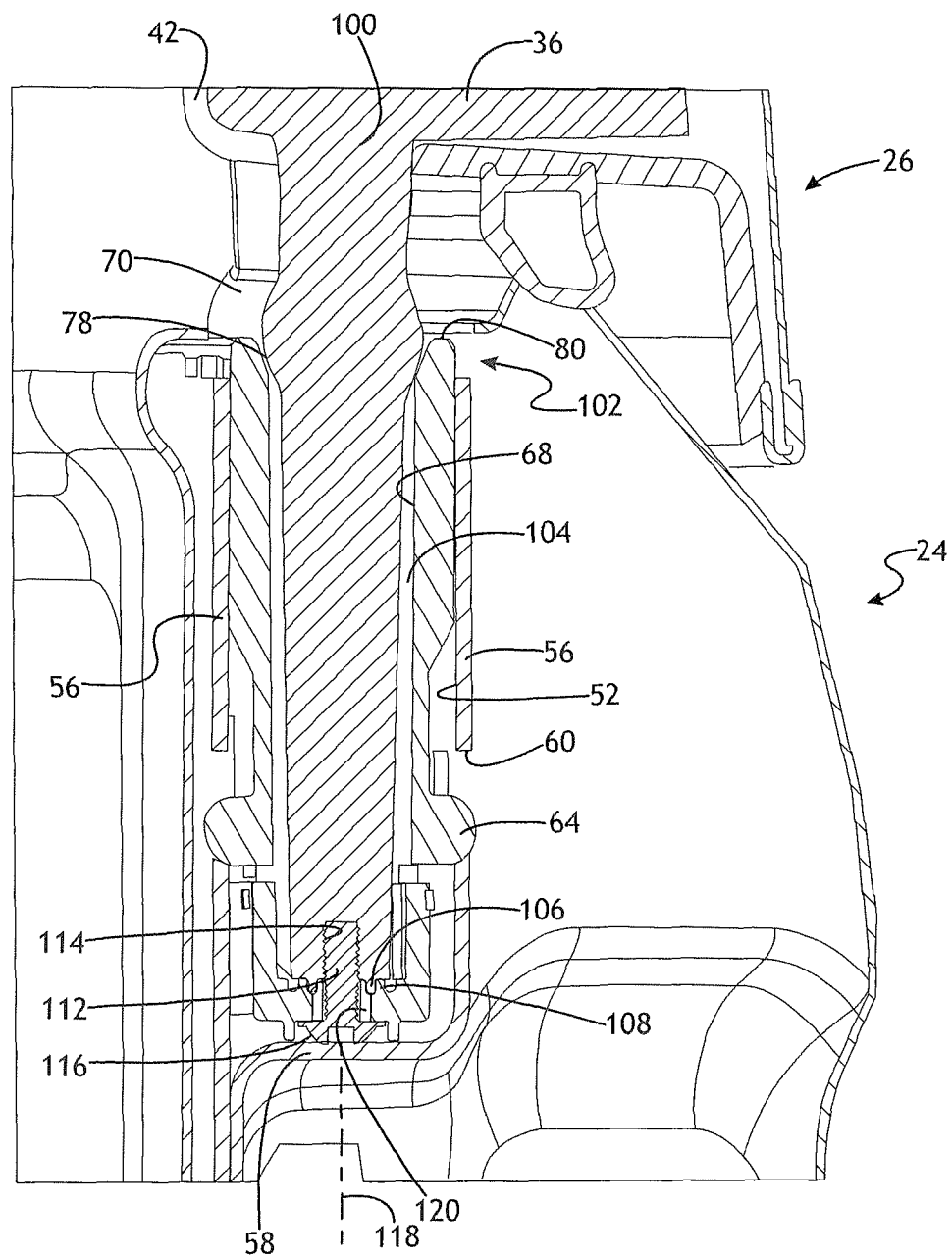
FIG. 6 is a fragmentary sectional view showing the projection and intermediate member of FIG. 5 within a void in a first section of a vehicle door.

In the implementation shown in FIGS. 5 and 6, a door 10' (FIG. 6) includes a first section 24 and a second section that includes projections 100 and intermediate members 102 that may be constructed substantially as described above with reference to the corresponding components in the implementation of FIGS. 1-4 described above. The following description will focus on the differences in this implementation from that previously discussed, and the same reference numerals will be used to describe the same or like components or features to facilitate description of those portions of this embodiment.

The projection 100 shown in FIGS. 5 and 6 is likewise arranged for cross-car adjustment within the intermediate member 102, with a suitable gap provided between the intermediate member 102 and projection 100 in the cross-car direction (e.g. an interior 104 of the intermediate member 102 is larger in the cross-car direction than is the projection 100). In this embodiment, the projection 100 includes one or more retention features, shown as teeth 106, that engage corresponding and cooperating retention features (e.g. teeth 108) formed in the intermediate member 102. In the example shown, the projection 100 includes teeth 106 extending downwardly from the second/free end 107 of the projection 100 in the vertical direction and the intermediate member 102 includes teeth 108 extending upwardly from a lower wall/second end 109 in the vertical direction. The projection 100 may be oriented in more than one position such that each projection tooth 106 may engage or be positioned adjacent (in the cross-car direction) to different intermediate member teeth 108 in the different positions of the projection 100 relative to the intermediate member 102. Thus, the projection 100 may be tilted in the cross-car direction within the interior 104 of the intermediate member 102 and the projection teeth 106 may be meshed with corresponding teeth 108 in the intermediate member 102 to hold the projection 100 in a desired position relative to the intermediate member 102. The teeth 106, 108, as shown, overlap in the cross-car direction and when meshed, prevent movement of the projection 100 in the cross-car direction to maintain a desired orientation of the projection 100 within the interior 104 of the intermediate member 102.

To maintain that position, a coupler 110 may be provided that engages both the projection 100 and intermediate member 102. In the implementation shown, the coupler 110 is a screw having a threaded shank 112 received in a threaded void 114 in the projection 100 and the screw has an enlarged head 116 that engages the intermediate member 102 when the screw 110 is tightened/advanced farther into the projection 100. The screw 110 may extend in any desired direction/orientation and is shown in FIGS. 5 and 6 as having a rotational axis 118 that is in the vertical direction, perpendicular to the cross-car direction and fore-aft direction. Thus, the screw 110 may be loosened to permit movement of the projection 100 relative to the intermediate member 102 and then tightened to maintain a desired position of the projection 100 relative to the intermediate member 102.

While described as teeth 106, 108, the projection 100 and intermediate member 102 may have any desired arrangement of retention surfaces that overlap to inhibit movement of the projection 100 from an adjusted position. For example, the retention surfaces may be defined by meshed/mating teeth, projections and voids, tabs, etc. While such surfaces may more positively locate the projection 100 within the intermediate member 102, the coupler 110 may be simply tightened when the projection 100 is in a desired position to maintain that position without any such retention features. To accommodate movement of the projection 100 and coupler 110 relative to the intermediate member 102, the intermediate member 102 may include an elongated slot 120 through which the shank 112 of the coupler 110 is received. As noted previously, the projection 100 may be received directly in a void 52 of the first section 24 without any intermediate member 102, in which case the coupler 110 would engage a surface of the first section 24 to maintain the projection 100 in a desired position relative to the first section 24. Thus, the position/orientation of the second section 26 of the door 10 relative to the first section 24 of the door 10 may be adjusted and maintained in a similar manner as described above.

The coupler 110 may also be rotated about an axis that is in the cross-car direction, fore-aft direction or any desired direction to maintain an adjusted position of the projection, as desired. Further, while cross-car adjustment is described, the second section 26 of the door 10 could be adjusted relative to the first section 24 in other directions, including fore-aft and vertical, in a similar way, by changing the position of the projection within the intermediate member or void, as desired.

What is claimed is:

1. A vehicle door, comprising:
a first section having a first void;
a second section having a first projection;
a first intermediate member received within the first void and having an inner surface that defines an interior, wherein the first projection is received within the interior; and
a first coupler rotatably coupled to and penetrating the first projection, wherein the interior of the first intermediate member has at least a portion that is larger than a portion of the first projection received within said portion of the interior to permit movement of the first projection relative to the intermediate member, and the first coupler being coupled to the intermediate member to maintain a position of the first projection relative to the first section.

2. The door of claim 1 wherein the first intermediate member is closely received in the first void in a cross-car direction to limit or prevent movement of the first intermediate member relative to the first section in the cross-car direction.

3. The door of claim 1 wherein the second section includes a second projection coupled to the second section and wherein the first section also comprises a second void in which the second projection is received, and which also includes a second intermediate member and a second coupler coupled to the second projection and the second intermediate member, wherein the second intermediate member has an interior with at least a portion that is larger than the corresponding portion of the second projection to permit movement of the second projection relative to the second intermediate member, and the second coupler being coupled to the second intermediate member to maintain the position of the second projection relative to the second intermediate member.

4. The door of claim 3 wherein the first projection is movable relative to the first intermediate member independently of any movement of the second projection relative to the second intermediate member.

5. The door of claim 1 wherein the first projection has a free end and the first projection engages the first intermediate member at a location spaced from the free end and wherein the free end is movable relative to the first intermediate member to change a cross-car angle of the second section relative to the first section.

6. The door of claim 1 wherein movement of the first projection relative to the first intermediate member changes the orientation of the second section relative to the first section.

7. A vehicle door, comprising:
a first section having a first void;
a second section having a first projection;
a first intermediate member received within the first void and having an inner surface that defines an interior, wherein the first projection is received within the interior; and
a first coupler coupled to the first projection, wherein the interior of the first intermediate member has at least a portion that is larger than a portion of the first projection received within said portion of the interior to permit movement of the first projection relative to the intermediate member, and the first coupler being coupled to the intermediate member to maintain a position of the first projection relative to the first section, wherein the first projection includes a threaded void and wherein the first coupler has a threaded section received within the threaded void for rotation relative to the projection about an axis.

8. The door of claim 7 wherein the first coupler includes a head that engages the first intermediate member when the first coupler is rotated so that it is advanced farther into the threaded void to inhibit or prevent movement of the first projection relative to the first intermediate member.

9. The door of claim 7 wherein the first coupler is coupled to the first intermediate member so that rotation of the first coupler about the axis does not move the first coupler along the axis, and wherein rotation of the first coupler in a first direction causes movement of the first projection relative to the first intermediate member in a first direction and rotation of the first coupler in a second direction causes movement of the first projection relative to the first intermediate member in a second direction.

10. A vehicle door, comprising:
a first section having a first void;
a second section having a first projection;
a first intermediate member received within the first void and having an inner surface that defines an interior, wherein the first projection is received within the interior; and
a first coupler coupled to the first projection, wherein the interior of the first intermediate member has at least a portion that is larger than a portion of the first projection received within said portion of the interior to permit movement of the first projection relative to the intermediate member, and the first coupler being coupled to the intermediate member to maintain a position of the first projection relative to the first section, wherein the first projection and first intermediate member include cooperating retention features that are engageable to define at least two positions of the first projection relative to the first intermediate member, and wherein the first coupler is a threaded fastener that when loosened permits movement of the first projection relative to the first intermediate member among said at least two positions and when tightened prevents movement of the first projection relative to the first intermediate member to maintain a position of the second section relative to the first section.

11. The door of claim 10 wherein the first projection is coupled to a body of the second section at a first end and extends to a second end, and wherein the first intermediate member includes an open first end and an at least partially closed second end, and wherein the cooperating retention features include at least one of projections and voids, or teeth formed on or in the second end of the first intermediate member and on or in the second end of the first projection.

* * * * *